(12) United States Patent
Ellison et al.

(10) Patent No.: US 7,231,449 B2
(45) Date of Patent: *Jun. 12, 2007

(54) COMPUTER SYSTEM HAVING A NETWORK ACCESS POINT

(75) Inventors: Brandon Jon Ellison, Raleigh, NC (US); Alan Ladd Painter, Raleigh, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 470 days.

This patent is subject to a terminal disclaimer.

(21) Appl. No.: 10/248,960

(22) Filed: Mar. 5, 2003

(65) Prior Publication Data
US 2004/0177125 A1 Sep. 9, 2004

(51) Int. Cl.
*G06F 15/16* (2006.01)
(52) U.S. Cl. .................................. 709/228; 709/250
(58) Field of Classification Search ............... 709/219, 709/217, 225, 203, 253, 228, 250; 707/10; 713/100; 370/245; 455/517
See application file for complete search history.

(56) References Cited

U.S. PATENT DOCUMENTS

| | | | | |
|---|---|---|---|---|
| 6,131,125 | A | 10/2000 | Rostoker et al. | 709/250 |
| 6,148,354 | A | 11/2000 | Ban et al. | |
| 6,161,104 | A * | 12/2000 | Stakutis et al. | 707/10 |
| 6,453,334 | B1 * | 9/2002 | Vinson et al. | 709/203 |
| 6,636,894 | B1 * | 10/2003 | Short et al. | 709/225 |
| 6,658,461 | B1 * | 12/2003 | Mazo | 709/217 |
| 6,671,725 | B1 | 12/2003 | Noel | 709/226 |
| 6,725,238 | B1 * | 4/2004 | Auvenshine | 707/200 |
| 6,857,009 | B1 * | 2/2005 | Ferreria et al. | 709/219 |
| 2002/0174331 | A1 * | 11/2002 | Nock et al. | 713/100 |
| 2002/0176366 | A1 * | 11/2002 | Ayyagari et al. | 370/245 |
| 2003/0045316 | A1 * | 3/2003 | Tjong et al. | 455/517 |
| 2004/0177166 | A1 * | 9/2004 | Ellison et al. | 709/253 |

FOREIGN PATENT DOCUMENTS

JP 92001-223730 A 8/2001

* cited by examiner

*Primary Examiner*—Jungwon Chang
(74) *Attorney, Agent, or Firm*—Sawyer Law Group; Carlos Munoz Bustaman

(57) ABSTRACT

A computing system incorporating a portable network access point device is disclosed allowing access to mapped network drives through FireWire (1394) or USB. The device contains all the necessary functions to access a network and shared network drives. The hardware has ethernet on one end and USB or FireWire on the other. When connected to a network, this device will attempt to connect to all shared network drives for which it has been programmed. When connected to a computer via USB/FireWire, the computer loads the drivers and maps the listed drives. The computer need not load the entire network stack to access these drives. After a onetime configuration, the technician would be able to access shared drives from any computer without reconfiguring the computer's network settings or drive mappings. The computer system accessing the device through the USB/FireWire port sees a storage device. As seen from the network, however, the device looks like a network card attached to the network.

6 Claims, 4 Drawing Sheets

COMPUTER SYSTEM HAVING A NETWORK ACCESS POINT

CROSS REFERENCE TO RELATED APPLICATIONS

This application is related to U.S. application Ser. No. 10/248,959, entitled Network Access Point Apparatus and Method, which is filed contemporaneously herewith and the disclosure(s) of which are incorporated herein by reference.

BACKGROUND OF THE INVENTION

This invention pertains to computer systems and other information handling systems and, more particularly, to a system having a portable network access point which allows access to mapped network drives as local drives through an I/O port of a computer system. Network administrators and software/hardware debuggers are required to map network drives each time they work on a new computer. The mapped network drives contain critical files needed in order to debug and repair the computer being worked on. However, accessing the network from the computer which needs service can be problematic. As an initial matter, setting up the network in each instance is extraordinarily time-consuming. Further, the mapping of network drives is also time-consuming and highly prone to user error as the administrator or software/hardware engineer must remember network paths and have access to user names and passwords. Furthermore, entering such user names passwords each time exposes those access codes to exploitation. Moreover, the problem with the computer can be a problem related to accessing the network itself, making it impossible to access the network in some cases. In another scenario, devices such as computers and the like which provide network access have the inherent disadvantage that configuring the network can be a wrought with error on the part of the end user. This translates into more time spent in support communique, which in turn raises the support cost for the device. Not only is the network difficult to configure, it can also be difficult to maintain as network resources change.

BRIEF SUMMARY OF THE INVENTION

Briefly, in a first embodiment, an apparatus is disclosed having an interface controller which couples to a network interface and a computer interface. The interface controller includes a nonvolatile memory for storing configuration data and program code. When the device of the first embodiment is coupled to a computer system on the computer interface, and to a network over the network interface, shared network storage devices are accessed and are presented as local drives to the computer system over the computer interface.

In a second embodiment, a portable apparatus is provided having an interface controller which couples to a network interface through a network interface controller and a computer interface through a computer interface controller. The interface controller includes a nonvolatile memory for storing configuration data and program code, and a RAM from which to execute the program code. When the device of the second embodiment is coupled to a computer system on the computer interface, and to a network over the network interface, shared network storage devices are accessed and are presented as local drives to the computer system over the computer interface.

In a third embodiment, an apparatus is provided comprising a computer system coupled through a computer interface to an interface controller which couples to a network through a network interface. The interface controller includes a nonvolatile memory for storing configuration data and program code. When the system of the third embodiment is coupled to a network over the network interface, shared network storage devices are accessed and are presented as local drives to the computer system over the computer interface.

In a fourth embodiment, a method is described in which a remote network storage device is accessed through the network interface of a network access point, the network access point having a computer interface, the network interface, and an interface controller. A local computer connection is established and the remote network storage device is presented as a local storage device at the computer interface.

BRIEF DESCRIPTION OF THE SEVERAL VIEWS OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
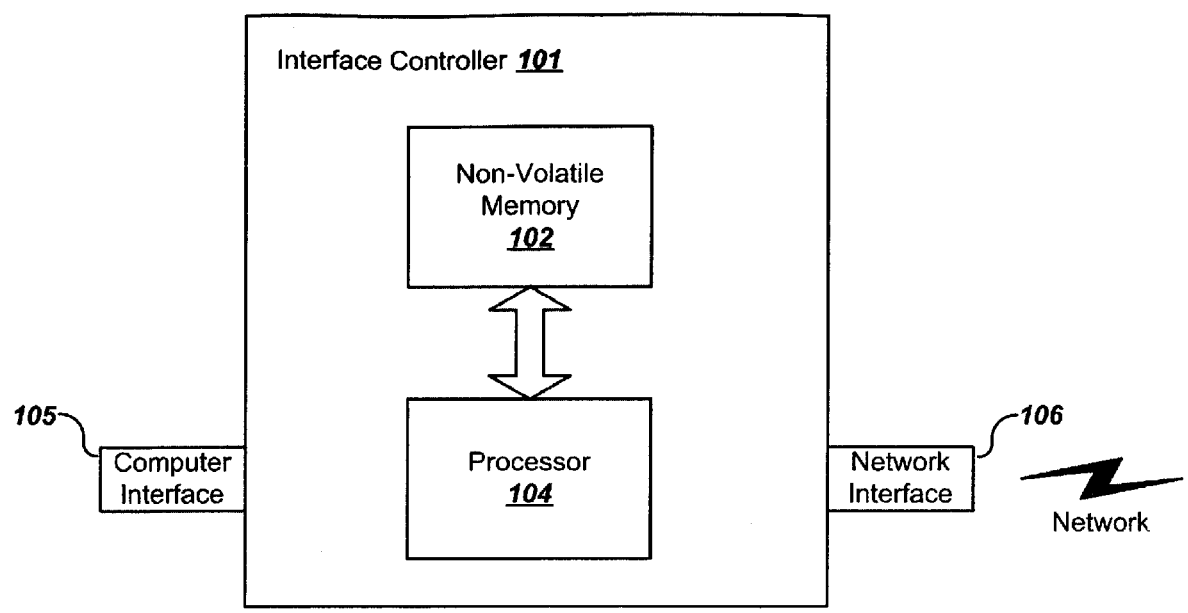
FIG. 1 is a block diagram of the portable network access point device of the current invention.

Referring now more particularly to the accompanying drawings, FIG. 1 shows a first embodiment of the present invention. A portable network access point device is shown which comprises an interface controller 101 which couples to a network via a network interface 106 on one side, and on the other side couples to a computer system via a standard computer I/O interface 105. While it is preferred that the device be portable, the device can also be made to be non portable without deviating from the spirit of the invention. The computer interface 105 can also be proprietary without departing from the spirit of the invention. The interface controller 101 itself comprises a nonvolatile memory 102, and a processor 104. The nonvolatile memory 102 stores configuration data and operational program code and provides a lasting storage media for the configuration data and operational program code across power on and power off cycles of the portable network access point device. The processor 104 executes the program code from the nonvolatile memory 102 itself if the nonvolatile memory 102 is fast enough and is accessible via random access techniques. In an alternative embodiment, when the nonvolatile memory 102 is, for example and not for the purpose of limitation, a serial EPROM or serial EEPROM, the processor 104 executes the program code from a separate RAM. The processor 104 can be implemented as a DSP, a microcontroller fast enough to handle network protocol, or a specialized chip which performs the specific functions disclosed herein. The configuration data holds all of the parameters required to access the network and the network shared drives. The configuration data also holds any lasting parameters which may be required for establishing connection with the computer over the computer interface 105. The interface controller 101 can be implemented as a single chip, or as a plurality of chips as need be and as mandated by cost restrictions. The interface controller 101 in this embodiment directly toggles the signal lines on the network interface 106 and on the computer interface 105.

The portable network access point device of FIG. 1 is preferably powered by power and ground lines provided at the computer interface 105. Alternatively the portable network access point can be self powered, or can be externally powered. When the network interface side of the portable network access point device is connected to an active network having one or more mapped and shared network drives, the interface controller 101 under the control of the processor 104 executing the program code attempts to connect to the network shared drives according to the configuration data. Preferably, the network connection is established using an automatic method of obtaining IP addresses and other parameters acquired to establish the network connection. One such automatic method is known as the DHCP (Dynamic Host Configuration Protocol) and is the method used by this device. Also, by example and not by the way of limitation, IP addresses and other network parameters required to establish initial network connectivity can be preconfigured statically and stored in the nonvolatile memory 102. For the most part, details concerning obtaining IP addresses and like to establish initial network connectivity have been omitted in as much as such details are not necessary to obtain a complete understanding of the present invention and are within the skills of persons of ordinary skill in the relevant art. In this embodiment of the interface controller 101 is charged with the task of maintaining the network stack and creating the correct network packets and staring the replied IP address for each request.

Preconfiguration of the portable network access point device of FIG. 1 need only be performed once, or performed once for every change in the network's configuration or topology. The processor 104 implements a set of commands for device setup purposes. A configuration program is provided with the device which provides a method of programming the network share paths, share names, and passwords etc. according to the device setup commands. The device driver provided with the device handles the low-level device setup commands while the configuration program handles the high-level interface to the user and the operating system. The software supports and encourages the use of username and passwords for security purposes. For security purposes, the software supports checking for an administrator password before entering into configuration mode. Once in configuration mode, the software sets up all network paths, user names and passwords as well as labels the connection or connections. The software also allows the user to specify a static IP address should DHCP not be supported by the network. The default mode is for configuration to be disabled. In an alternative embodiment, there can be a means to reset the entire device to a pinhole in case the password is forgotten. This could be implemented as a latch, that once set, would cause the processor 104 to erase all of the data in the nonvolatile memory 102 removing all passwords and retaining the security of the device.

The processor 104 is selected to be fast enough to implement a network stack on the ethernet side of the device as well as handling basic drive commands on the computer interface side simultaneously. Preferably, the processor 104 is selected to handle multiple drives and network connections to several servers. However, the processor 104 need not be exceptionally fast because computer interface ports allow for slow access devices such as floppy drives or flash memory. Further, in case of network buffer overlooked, the processor 104 can issue nAcks (non acknowledges) that will slow down the data until it is able to be handled by the processor 104.

When the computer interface 105 side of the portable network access point device is connected to a computer, the interface controller 101 under the control of the processor 104 executing the program code establishes the portable network access point device as a local storage device connected through the computer interface 105. In two preferred embodiments, the computer interface 105 is implemented as a standard serial computer I/O interface such as USB or 1394, the respective specifications for which are incorporated herein by reference. The preferred embodiment of the device is implemented as a Microsoft™ Windows™ compatible device wherein, when the device is first connected to the computer, a driver automatically loads for the device; at tat point the driver identifies itself to system as a local storage device per the USB or 1394 specifications. Details concerning how a Windows™ compatible device driver identifies itself as a local disk are well known in the art and are omitted so as to not obfuscate the present disclosure in unnecessary detail. Once the device driver loads and identifies itself as a local storage device accessible over the USB or 1394 serial I/O bus, the remote network shared drives are presented as local disk drives. On the host computer, new drive letters appear in the Windows™ Explorer™ with the labels assigned per the configuration data. From that point on, the user may read/write/execute from the shared drives according to their permissions. Optionally, the connection to the network as described above can be deferred until the device is coupled to the computer system. Note that the remote network access point device, although presenting itself as a local storage device, need not have a hard disk or flash memory on board as these devices are emulated. Indeed, it is preferred to not have a hard disk or a flash memory implemented as part of the device because of the added risk and cost associated with these devices.

The device driver emulates the functions of ordinary USB or 1394 local storage functions such as browsing, streaming, and execution functions and commands. The driver passes those commands on to the interface controller 101/processor 104 through the USB or 1394 interface 105 on the device. The processor 104 then interprets which connection the command is meant for and sends the appropriate packet or packets to the proper connection according to the configuration data stored in the nonvolatile memory 102. Then, as data is received over the network and through the network interface 106, the interface controller 101/processor 104 passes the data back to the driver, identifying the connection the data came from.

Figure 2:
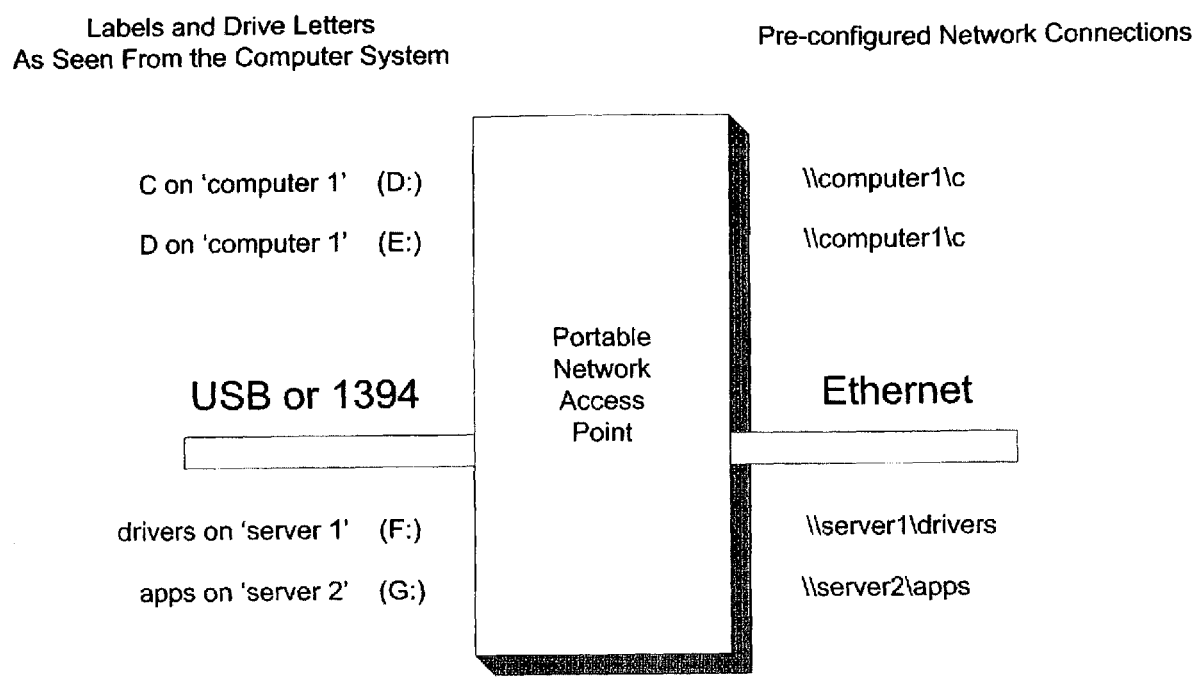
FIG. 2 illustrates how the portable network access point device of FIG. 1 appears to both the computer, and to the network.

FIG. 2 shows how the portable network access point device of FIG. 1 appears to both the computer, connected through the USB or 1394 interface 105, and to the network, connected through the network interface 106, in this example an ethernet interface. On the USB or 1394 side, the shared drives and folders each appear as drive letters for local access. Note that the labels given to the drive letters correspond to the network share names and share paths as configured by the device driver according to the configuration data.

In the preferred embodiment of the portable network access point device of FIG. 1, certain network traffic is excluded from the USB or 1394 interface 105. Alternatively, and not by way of limitation, all network traffic can be blocked at the USB or 1394 interface side of the device. For example, the configuration data which is initially stored in the nonvolatile memory 102 can include username and password information related to accessing the network on the network side of the device. In the preferred embodiment, exchange of this username and password data with the computer system attached to the device is preferably blocked. Likewise, any command which is not a local disk drive access command can be blocked by the driver. For example, any exchange of network protocol commands through the USB or 1394 bus 105 to the computer system can be blocked. Furthermore, since the device of FIG. 1 maintains the network stack for the network connection, the computer system connected to the 1394 or USB bus 105 need not have any knowledge of the network stack and need not be configured to access the network having the shared drives of interest. Indeed, the computer system need not even have a properly functioning network connection, or may not have a network interface at all. However, should the computer system have an operating network, that network need not be disrupted or reconfigured in order to access the drives of interest (the shared drives accessed by the portable network access point device). Indeed, for purposes of security, it may be preferred to not share network access information. Accordingly, since configuration data stored in the nonvolatile memory 102 can contain data related to the network stack, any exchange of network stack data with the computer connected through the USB or 1394 interface 105 can be blocked or otherwise suppressed.

In an alternative embodiment, network accesses between the portable network access point device and the servers providing the shared drives and folders are implemented as secure transactions. Complementary software is required on both the portable network access point device and the server or servers sharing the drives. This can be implemented as a Virtual Private Network (VPN), the specification for which is incorporated herein by reference, or any other equivalent secure protocol such as the TCPA specification, the specification for which is also incorporated herein by reference. In this secure embodiment, the device securely passes information by sharing keys with the server. The shared drive would allow access only from portable network access point device.

Figure 3:
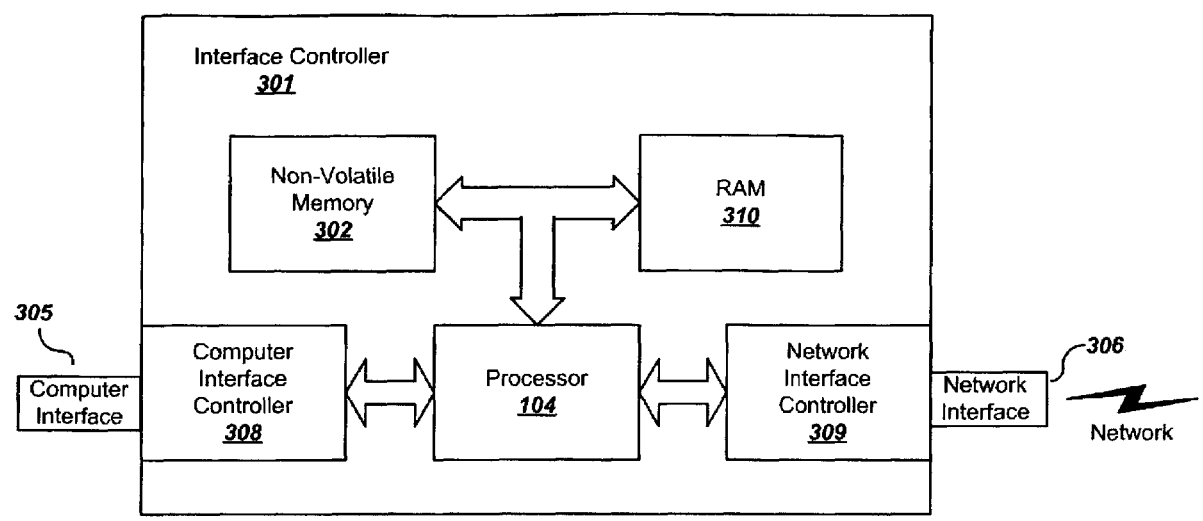
FIG. 3 illustrates a portable network access point device configured in accordance with a second embodiment of the present invention.

FIG. 3 illustrates a portable network access point device configured in accordance with a second embodiment of the present invention. Unless stated otherwise, the device of this embodiment functions similarly to the device of the embodiment shown in FIG. 1 with respect to the attached computer system and the attached network. In the embodiment of FIG. 3, a network interface controller chip 309 is introduced to alleviate low-level network interface tasks from the interface controller 301. Likewise, a computer interface controller chip 308 is introduced to alleviate low-level computer interface tasks from the interface controller 301. The network interface controller chip 309 shown in the example of FIG. 3 is an ethernet controller chip. The computer interface controller chip 308 shown is a USB or 1394 serial interface controller. The computer interface 305 need not be serial; for example, it may be parallel or muxed. The computer interface 305 connection need not be wired; for example, it may be wireless. The network cable plugs in to the network interface 306 of the network interface controller 309. The USB or 1394 serial cable plugs into the computer interface 305 of the computer interface controller 308. This embodiment further includes a RAM 310 from which the processor executes the program code which is initially loaded from the nonvolatile memory 302 when power is first applied to the device. The device is encased in a portable housing (not shown) which houses the interface controller 301, the computer interface controller 308, and the network interface controller 309. This device is made small enough to fit in one's pocket and preferably derives power from the computer interface 305. As such, the device is small, lightweight, low-cost, and is highly reliable.

Figure 4:
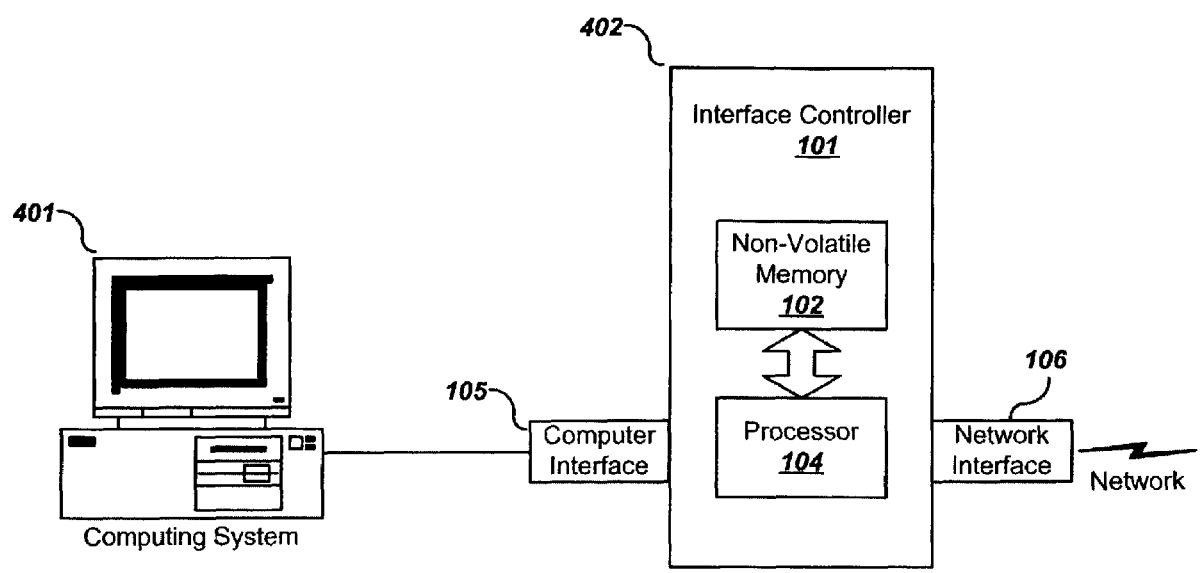
FIG. 4 depicts a system configured in accordance with a third embodiment of the present invention.

FIG. 4 illustrates a system configured in accordance with a third embodiment of the present invention. In this embodiment, a computer system 401 is combined with a network access point device 402. The computer system 401 and the network access point device 402 are connected via a computer interface 105. The network access point device 402, in turn, is connected to a network having shared network drives which are to be presented as described supra as local drives. The computer system 401 may otherwise have a network connection. The network access point device 402 of this embodiment is preconfigured as described above with respect to the portable network access point embodiments of FIGS. 1 and 3, and provides the computer system 401 with local drive access to shared network drives and folders using local disk drive access commands over the computer interface 105. Unless stated otherwise, the network access point device 402 of the system of this embodiment functions similarly to the device of the embodiment shown in FIG. 1 with respect to the attached computer system 401 and the attached network. In the embodiment of FIG. 4, the computer system 401 and the network access point device 402 can be housed together or, alternatively, can be housed separately if it is desired to provide them separately. The computer system 401 need not have knowledge of the network stack or other network information required to access the shared drives and folders. More importantly, as the device is either a preconfigured or a remotely-configured device (DHCP), the user need not have any technical network conductivity know-how.

The computer system 401 of the third embodiment is preferably an IBM™ compatible system. However, other computing systems can be employed without departing from the spirit of the invention. Details concerning the construction and use of computer systems are well known in the art and are omitted so as to not obscure the present disclosure in unnecessary detail.

In any of the embodiments described, the computer system need not have any knowledge as to how the drives are connected (TCP/IP, IPX etc.) and therefore the computer does not have to load the network stack to access the shared drives. The computer system can be any portable or non portable computing device. Such devices include: pen computers, laptop computers, palm computers, desktop computers, servers, game boxes, set top boxes etc.

For the portable embodiments, the user could take the device to any location which has access to the desired network, connect it to the network and to the computer and instantly have access to their shared files. In use, as an example and not by way of limitation, a computer technician employing any of the portable embodiments described hereinabove avoids the need to set up network settings for every computer the technician encounters. After the onetime configuration of the portable network access point device, the technician would be able to access shared drives with information such as drivers or applications from any other computer accessible by the network connection without reconfiguring the computer's network settings and without mapping drives. The device configuration can be repeatedly reconfigured as needed. The configuration can also be performed remotely and automatically without departing from the spirit of the invention.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
    a network interface;
    a computer interface;
    an interface controller having a non-volatile memory for storing configuration data and program code and further having a processor for executing the program code, the interface controller being coupled to the network interface and the computer interface; and
    a computer system operatively coupled to the computer interface;
    wherein, in response to a network being provided on the network interface, the interface controller while the processor is executing the program code is effective to:
    establish network connectivity between the computer system and a remote network drive on the network through the network interface based upon the configuration data, including presenting the remote network drive as a local drive to the computer system through the computer interface,
    wherein the network connectivity between the computer system and the remote network drive is established independent of the computer system.

2. The apparatus of claim 1, wherein the interface controller maintains a network stack for the network connection between the computer system and the remote network drive independent of the computer system.

3. The apparatus of claim 1, wherein the network connectivity between the computer system and the remote network drive is established through DHCP (Dynamic Host Configuration Protocol).

4. The apparatus of claim 1, wherein the interface controller is implemented as a single chip.

5. The apparatus of claim 1, wherein the computer system is a portable computer system.

6. The apparatus of claim 1, wherein the computer system is one of a pen computer, a laptop computer, a palm computer, a desktop computer, a server, a game box, or a set top box.

* * * * *